(12) United States Patent
Chiu

(10) Patent No.: US 8,435,146 B2
(45) Date of Patent: May 7, 2013

(54) CHAIN WHEEL

(75) Inventor: Hsien-Juey Chiu, Auckland (NZ)

(73) Assignee: Vetus NV, Schiedam (NL)

( * ) Notice: Subject to any disclaimer, the term of this patent is extended or adjusted under 35 U.S.C. 154(b) by 0 days.

(21) Appl. No.: 11/835,862

(22) Filed: Aug. 8, 2007

(65) Prior Publication Data
US 2008/0153645 A1 Jun. 26, 2008

(30) Foreign Application Priority Data
Aug. 8, 2006 (NZ) .................................. 549054

(51) Int. Cl.
*B66D 1/20* (2006.01)
(52) U.S. Cl.
USPC .......................................... 474/164; 254/311
(58) Field of Classification Search .................. 474/152, 474/155, 164; 254/372, 358, 311
See application file for complete search history.

(56) References Cited

U.S. PATENT DOCUMENTS

| 325,539 | A | * | 9/1885 | Herman | 474/164 |
| 662,768 | A | * | 11/1900 | Crowe | 110/330 |
| 3,302,932 | A | * | 2/1967 | Wallin | 254/390 |
| 3,415,135 | A | * | 12/1968 | Royer et al. | 474/155 |
| 3,766,791 | A | * | 10/1973 | Huttinger | 474/155 |
| 3,953,000 | A | * | 4/1976 | Zorbaugh | 254/358 |
| 5,314,166 | A | * | 5/1994 | Muir | 254/371 |
| 5,544,863 | A | * | 8/1996 | Ueno et al. | 254/358 |
| 6,394,421 | B1 | * | 5/2002 | Henly | 254/365 |

FOREIGN PATENT DOCUMENTS
WO WO-84/03341 8/1984

* cited by examiner

*Primary Examiner* — Robert A Siconolfi
*Assistant Examiner* — Stephen Bowes
(74) *Attorney, Agent, or Firm* — Leason Ellis LLP

(57) ABSTRACT

The invention provides a chain wheel part comprising a center about which the part is adapted to rotate in use, and a plurality of chain link receiving pockets. Each pocket is shaped such that a first end of a chain link received in the pocket in use is nearer the center of the wheel than a second end of the chain link. The invention also provides a chain wheel including two such chain wheel parts.

13 Claims, 15 Drawing Sheets

CHAIN WHEEL

CROSS-REFERENCE TO PRIOR APPLICATION

This application claims priority to New Zealand Application No. 549054, filed on Aug. 8, 2006, which is incorporated by reference herein in it entirety.

FIELD OF THE INVENTION

This invention relates to chain wheels or similar articles such as sheaves or pulleys which are used to control or direct the path of a chain. The invention has particular application to chain wheels used in winches such as marine winches.

BACKGROUND

Chain wheels are known which have pockets adjacent to the periphery of the wheel, each pocket being constructed so as to receive a link of a chain. In this way, each link of the chain may be received snuggly within a pocket as the chain passes around the wheel. In many applications, the wheel is driven by a driving element such as a lever or motor forming part of a winch which may be used to lift or lower articles to which the chain is connected, for example an anchor.

In known constructions, the pocket is usually formed with an internal side which is at a tangent to the wheel. That is to say, the side of the chain wheel pocket nearest the centre of rotation of the wheel is at 90 degrees to a radial line from the centre of the chain wheel pocket to the centre of rotation of the wheel.

One disadvantage with existing constructions is that the chain wheel pocket needs to be constructed solely for a very narrow range of chain sizes.

SUMMARY OF THE INVENTION

Accordingly in one aspect the invention broadly consists in a chain wheel part having a centre about which the part is adapted to rotate in use, a plurality of chain link receiving pockets, each pocket being shaped such that a first end of a chain link received in the pocket in use is nearer the centre of the chain wheel part than a second end of the chain link.

Preferably the construction is such that the second end may be readily removed from the pocket.

Preferably the construction is such that the wheel is rotated in use to apply a force to a chain by applying force to the first end of the chain link.

Preferably each pocket is provided at an angle other than at 90° to a radial line from the centre of the pocket to the centre of rotation.

Preferably one or more of the pockets includes a recess in a direction parallel to the axis of rotation of the chain wheel part.

Preferably each pocket has a first end to receive the first end of the chain link and a second end to receive the second end of the chain link.

Preferably each pocket is constructed such that the second end of one pocket is adjacent to the first end of the next pocket.

Preferably the wall at one or both ends of a pocket is offset from being parallel to the axis of rotation.

Preferably the chain wheel part comprises a rib extending from between an adjacent pair of pockets to a central region of the chain wheel part. More preferably one said rib is provided between each adjacent pair of pockets.

Preferably the portion of each rib between adjacent pairs of pockets is offset from the first end of the first pocket of the pair towards the second end of the second pocket of the pair.

Preferably the chain wheel part comprises one or more ribs extending from the inner side of each pocket to a central region of the chain wheel part.

Preferably two chain wheel parts are provided.

Preferably means are provided to engage the two chain wheel parts to prevent slippage therebetween in use.

In a further aspect the invention broadly consists in a chain wheel part having a centre about which the part is adapted to rotate in use, a plurality of chain link receiving pockets, each pocket having a first end adapted to receive a first end of a chain link and a second end adapted to receive the second end of a chain link, the first and second ends of each pocket being arranged such that the first end of a chain link received in the pocket in use is nearer the centre of the wheel than the second end of the chain link.

BRIEF DESCRIPTION OF THE DRAWINGS

One or more embodiments of the invention will be described below with reference to the accompanying drawings in which FIG. 1 Is an isometric view of a first chain wheel part according to a first embodiment of the invention.

DESCRIPTION OF ONE OR MORE EMBODIMENTS OF THE INVENTION

Figure 1:
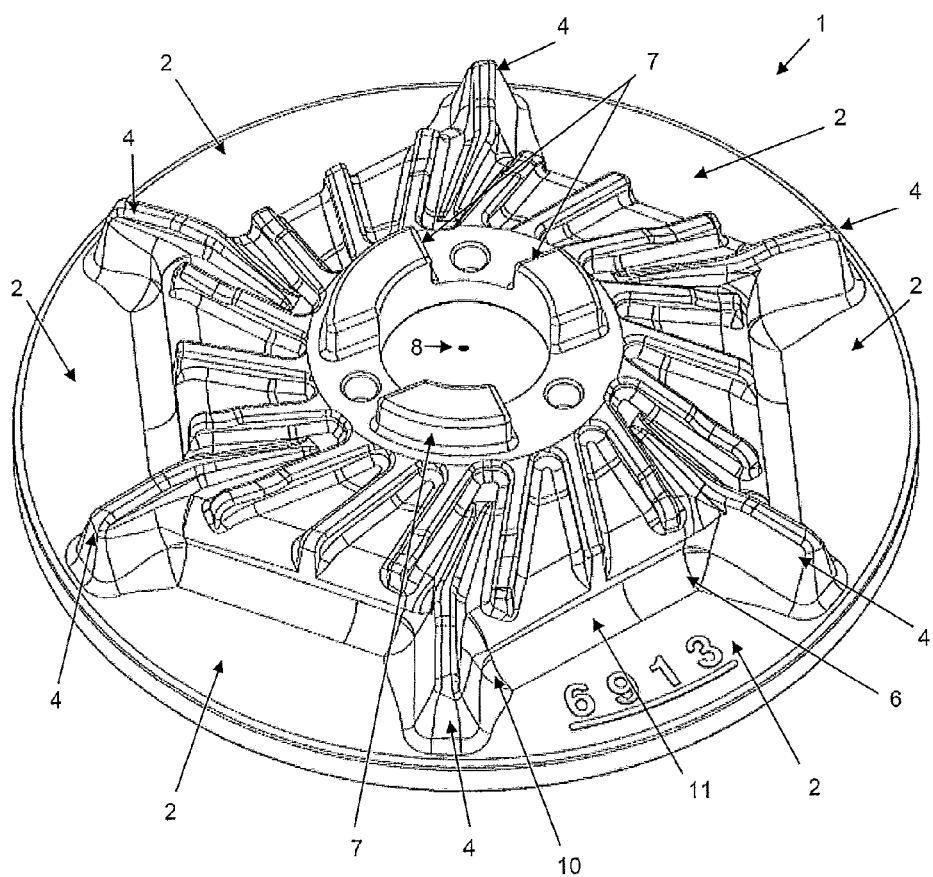
Figure 2:
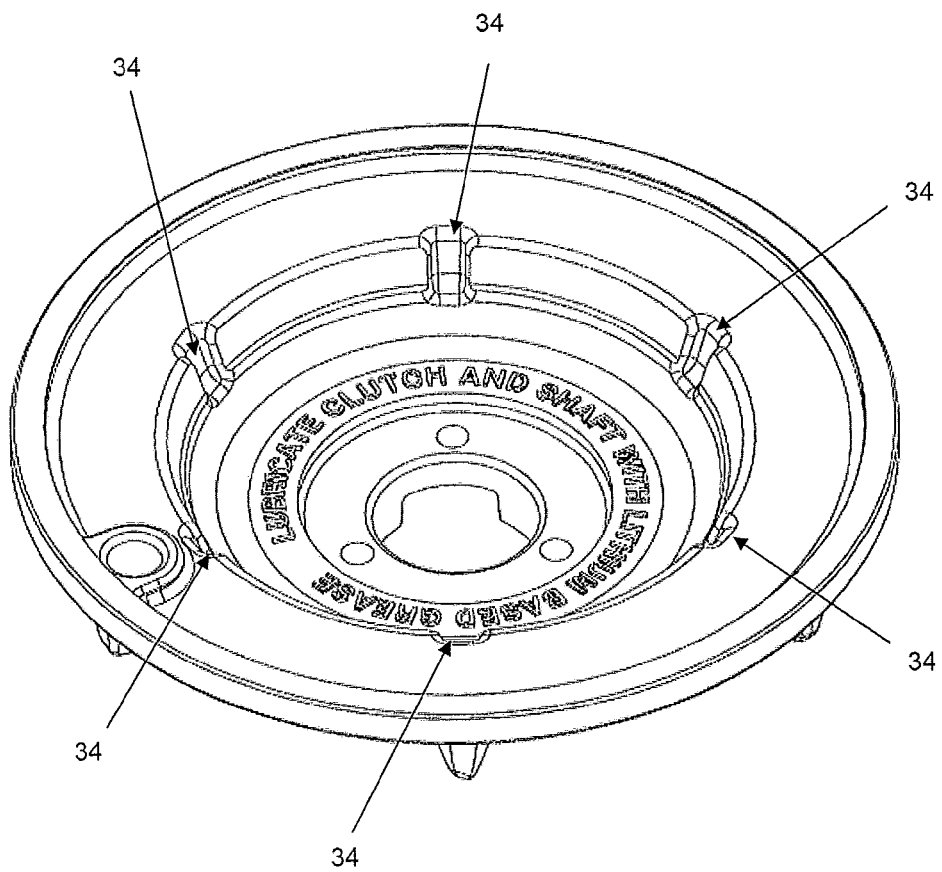
FIG. 2 Is an isometric view of the opposite side of the first chain wheel part of FIG. 1.
Figure 3:
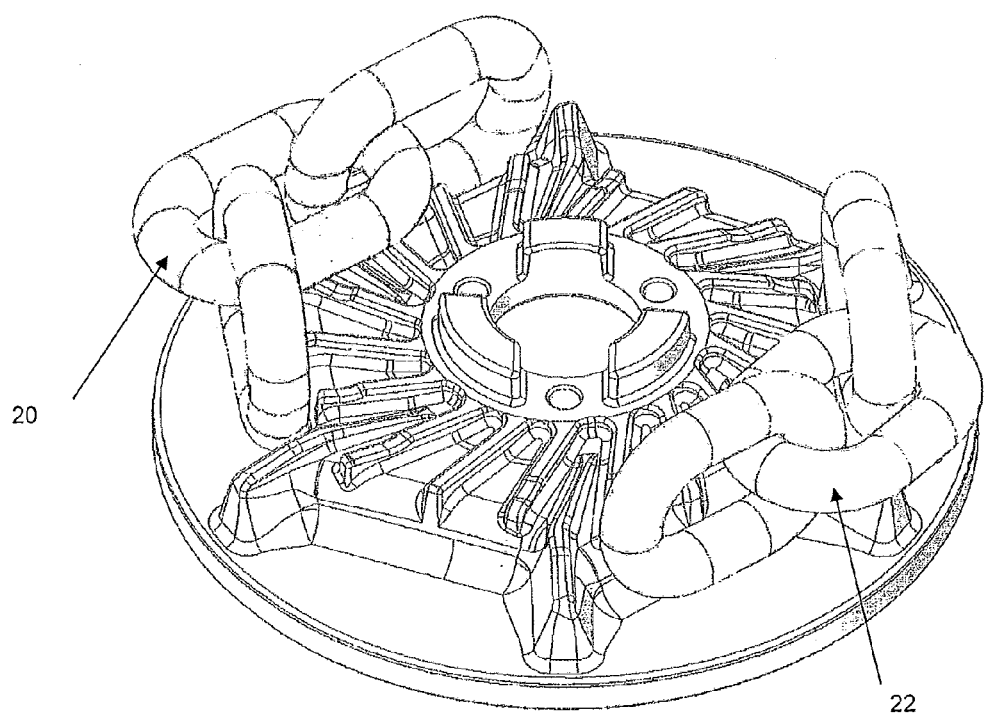
FIG. 3 Is an isometric view showing a partial view of two different types of chain being used with the first chain wheel part of FIG. 1.

Referring to the drawings, FIGS. 1 to 3 show a first chain wheel part according to a first embodiment of the invention, generally referenced 1, which has a plurality of chain pockets 2. Each chain pocket is divided by a protrusion 4 from adjacent pockets 2, and each pocket 2 has two ends. A first end 6 is nearer to centre of rotation 8 of the chain wheel than a second end 10 of each pocket. The first end 6 can accommodate the first end of a chain link and the second end 10 can accommodate the second end of the chain link so that the first end of the chain link is provided nearer the centre of rotation 8 than the second end. This may be seen with reference to FIG. 3.

In a preferred embodiment, inner side 11 of each pocket 2 (i.e. the side between ends 6, 10 and nearest to centre of rotation 8), is at an angle to a radius provided between the centre of inner side 11 of pocket 2 and centre of rotation 8. This is better seen with reference to FIG. 4. Rather than the angle A (FIG. 4) being 90 degrees as in known constructions, Angle A is less than 90 degrees.

The arrangement as can be seen from FIGS. 1 and 3 (and FIGS. 4 and 5 for a second chain wheel part according to the first embodiment of the invention) is such that the depth of chain pockets 2 is different at each end, so that protrusions 4 divide a shallow end (second end 10) and adjacent deep end (first end 6) between each pair of adjacent pockets 2.

Figure 4:
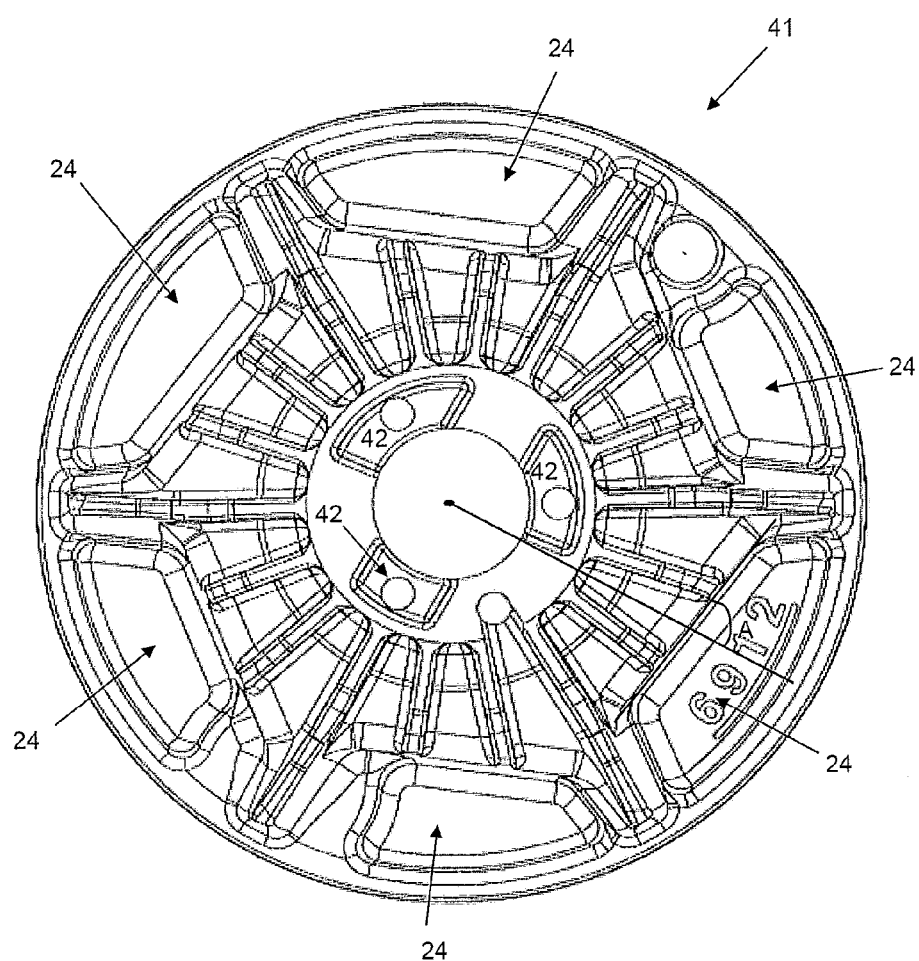
FIG. 4 Is a plan view of a second chain wheel part according to the first embodiment of the invention.
Figure 5:
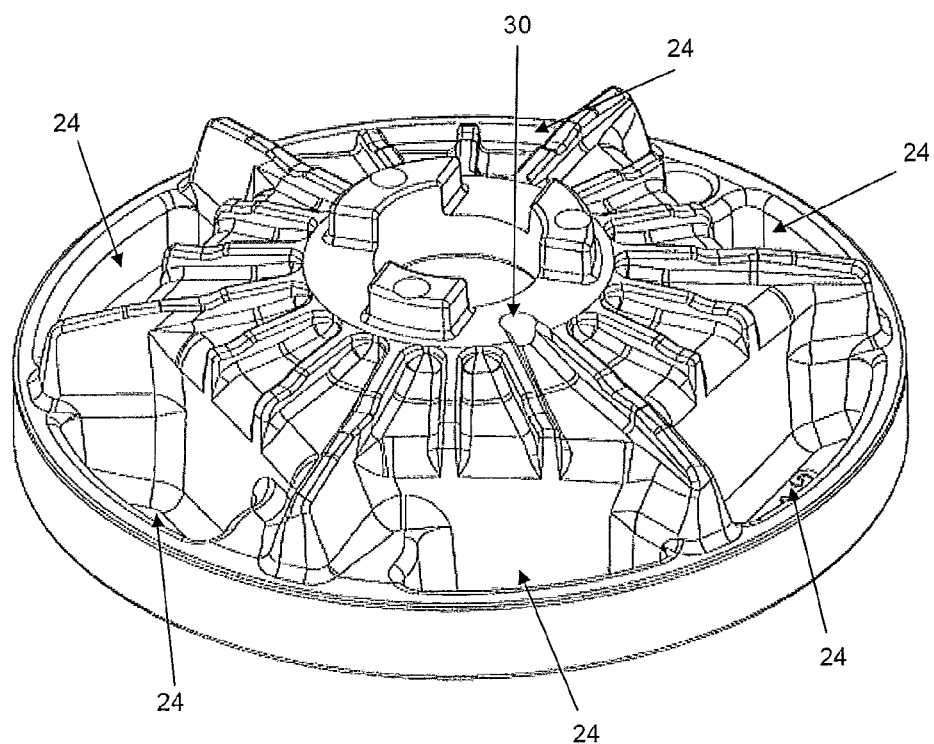
FIG. 5 Is an isometric view of the second chain wheel part of FIG. 4.
Figure 6:
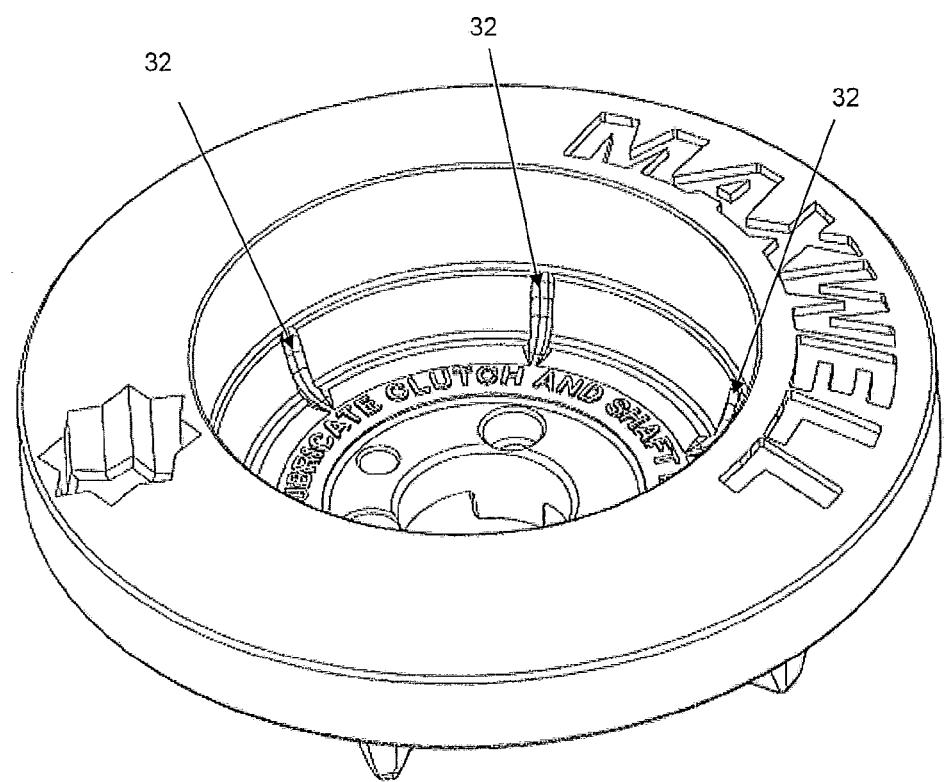
FIG. 6 Is an isometric view of the opposite side of the second chain wheel part of FIGS. 4 and 5.

First chain wheel part 1 is configured to cooperate with second chain wheel part 41 of FIGS. 4 to 6 and includes many of the same features as first chain wheel part 1. Like references have been used for like features.

Second chain wheel part 41 includes pockets 2 divided by protrusions 4 and centre of rotation 8, wherein the pockets are defined by first and second ends 6, 10 and inner side 11.

The operation of the chain pocket in use is shown in more detail with reference to FIG. 3. Referring to that Figure, it can be seen that two different sized chain links can be accommodated in the same size pocket. Therefore, first chain 20 is shown and a chain 22 is also shown, each chain having a different link length. This flexibility is achieved because the angle of the inner side 11 of the chain pocket provides an enlarged contact plane which can accept a longer link chain into the pocket.

A further advantage of the construction is that the shallower end of each pocket allows the chain to swing out more easily from that end. Therefore a shorter link of chain can swing out from the chain pocket. Furthermore, a generally smoother operation of chain link removal from each pocket occurs.

A further advantage of the construction is that the chain is stopped at the deeper end in a more secure fashion against the inner wall of protrusion 4. Therefore there is a deeper engagement which results in a more reliable engagement with less chance of the chain jumping out of the chain pocket during use. Furthermore, because the other side of the protrusion has a shallow recess, there is greater structural integrity to the pocket in use. This is because the pocket is rotated in a direction from the deep end to the shallow end.

Furthermore, because of this stronger structure, it has been found that recesses 24 can be provided in the base of each pocket. Therefore, recesses 24 are provided in a perpendicular direction i.e., in a direction parallel to the axis of rotation of the chain wheel. This is best seen with reference to FIG. 5. This has the advantage of reducing the overall weight of the construction. While recesses 24 are shown only in relation to second chain wheel part 41, it will be appreciated that recesses 24 may additionally or alternatively be provided in first chain wheel part 1.

Figure 7:
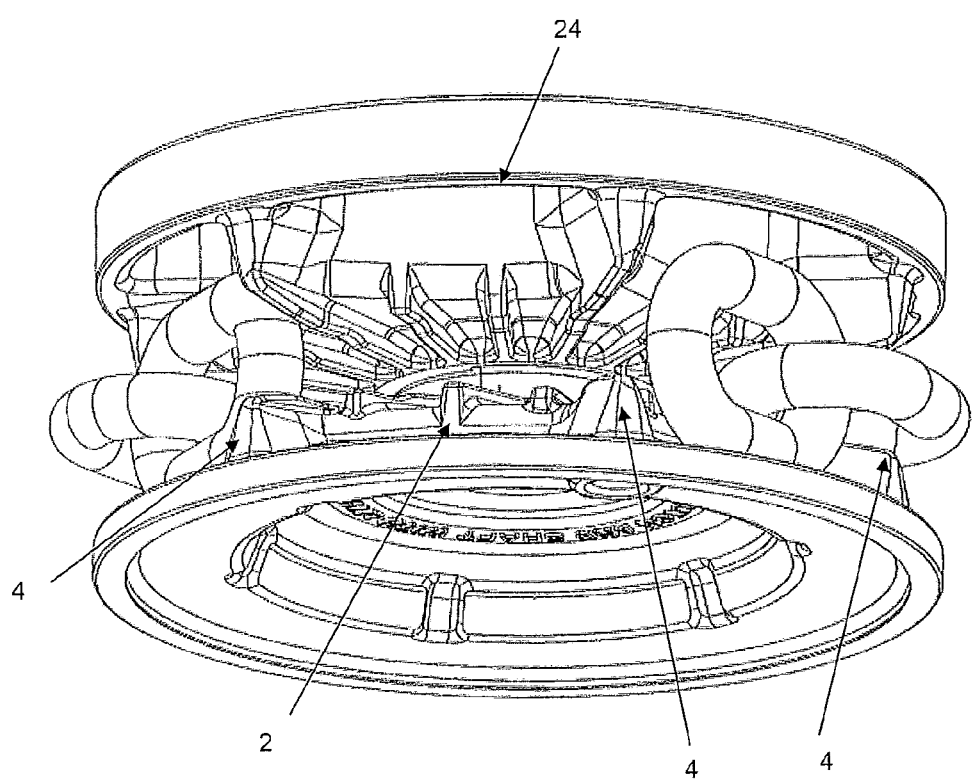
FIG. 7 Is an isometric view of the chain wheel parts of the preceding Figures being used together to form a chain wheel.
Figure 8:
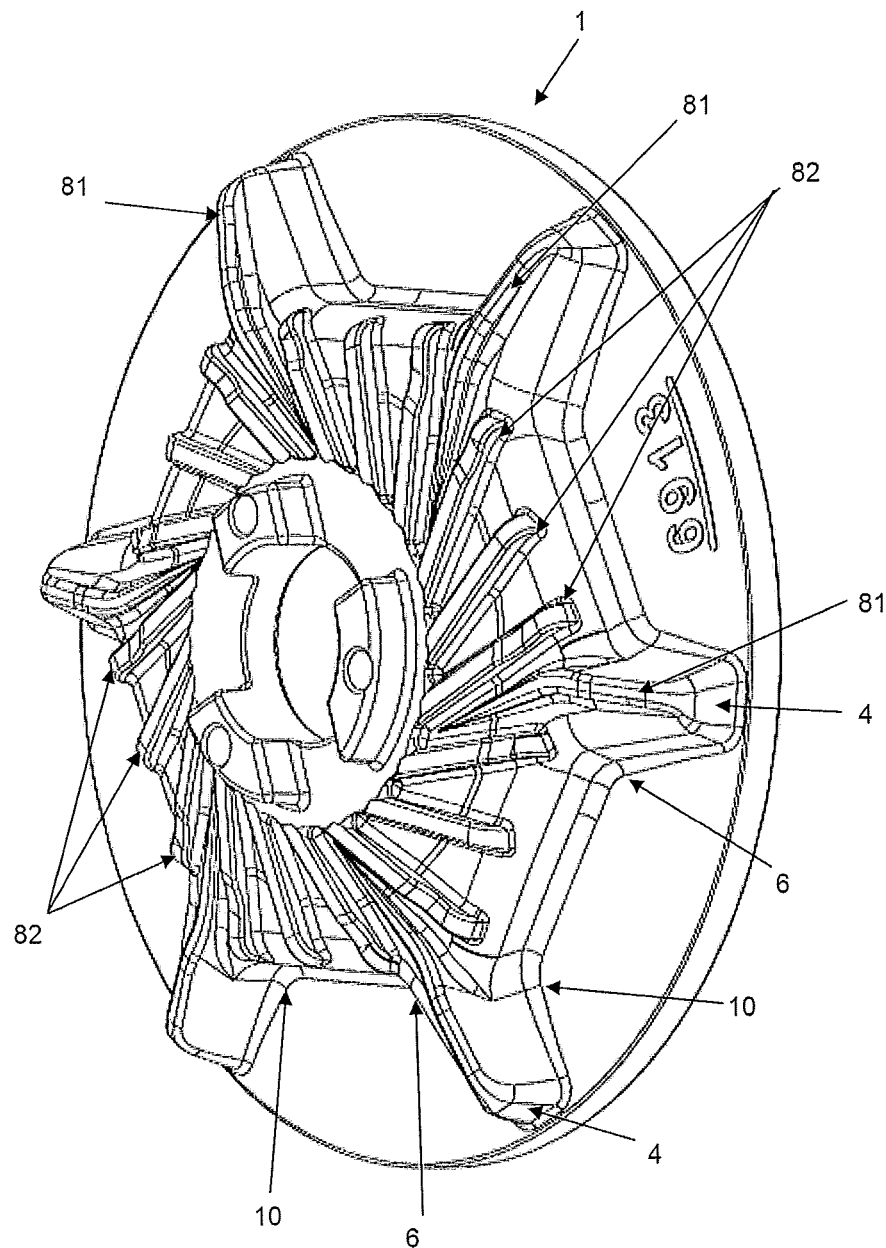
FIG. 8 Is an isometric view of a first chain wheel part according to a second embodiment of the invention.
Figure 9:
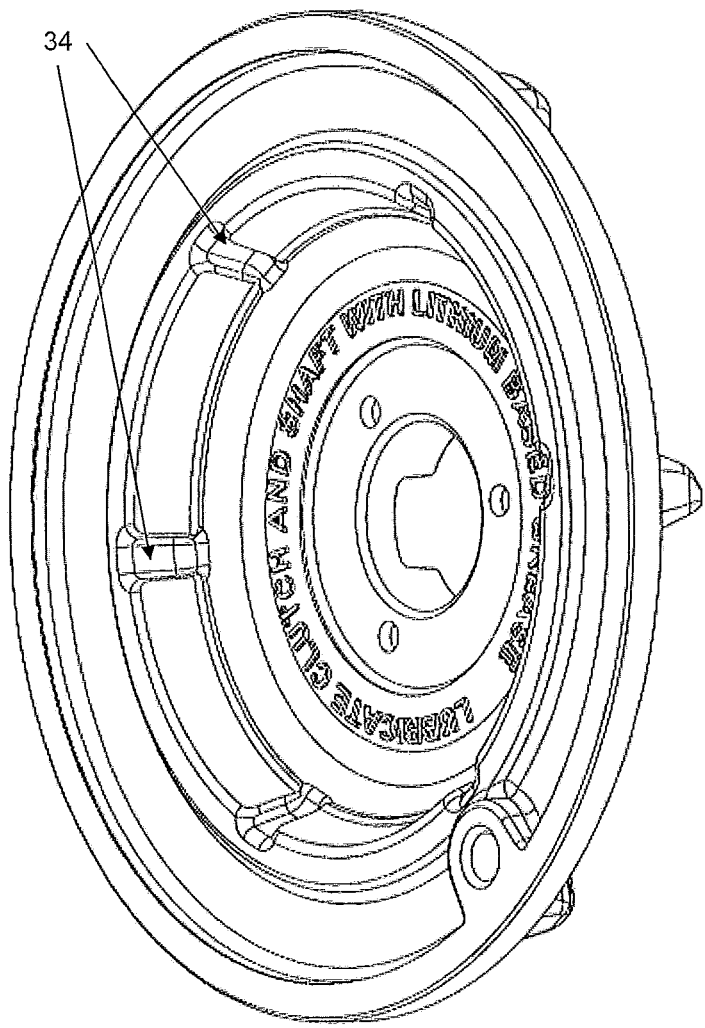
FIG. 9 Is an isometric view of the opposite side of the first chain wheel part of FIG. 8.
Figure 10:
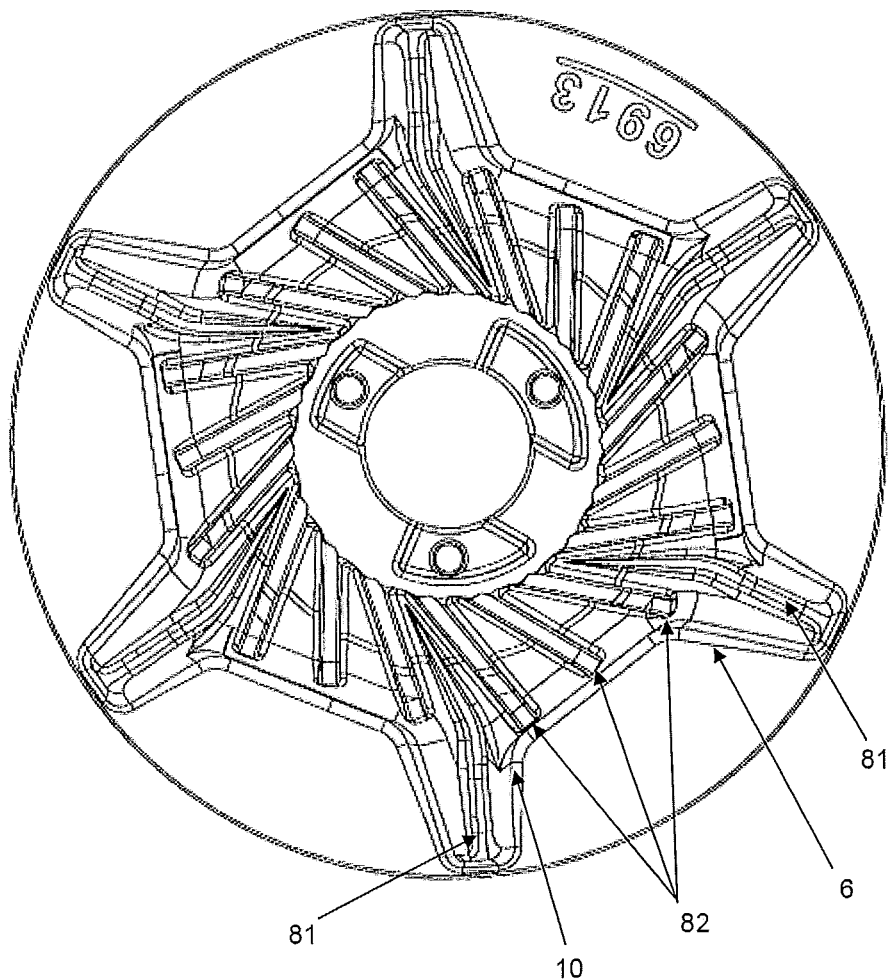
FIG. 10 Is a plan view of the first chain wheel part of FIGS. 8 and 9.

The chain wheel parts 1, 41 of FIGS. 1 to 6 are assembled as shown in FIG. 7 to provide the resulting structure, wherein bosses 7 of the first chain wheel part 1 interlockably engage bosses 42 of the second chain wheel part 41 so as to maintain a fixed relation therebetween in use.

Furthermore, as can be seen from the drawings, the chain wheel may also function as a rope sheave through use of the ribs that extend from the inner side of each pocket to a central region of the wheel.

Finally, a drainage hole 30 may be provided to facilitate drainage of water or other unwanted fluid in use. Also, recesses 32 and 34 provide grease grooves. The chain wheel assembly is in use driven by a top and bottom clutch cone, and the contact area of the chain wheel with these surfaces means that the grease grooves are advantageous for lubricating the chain wheel and clutch cones. This extends the life of the apparatus.

Furthermore, the grease grooves also provide a channel for foreign matter to be removed from the clutch faces.

Figure 11:
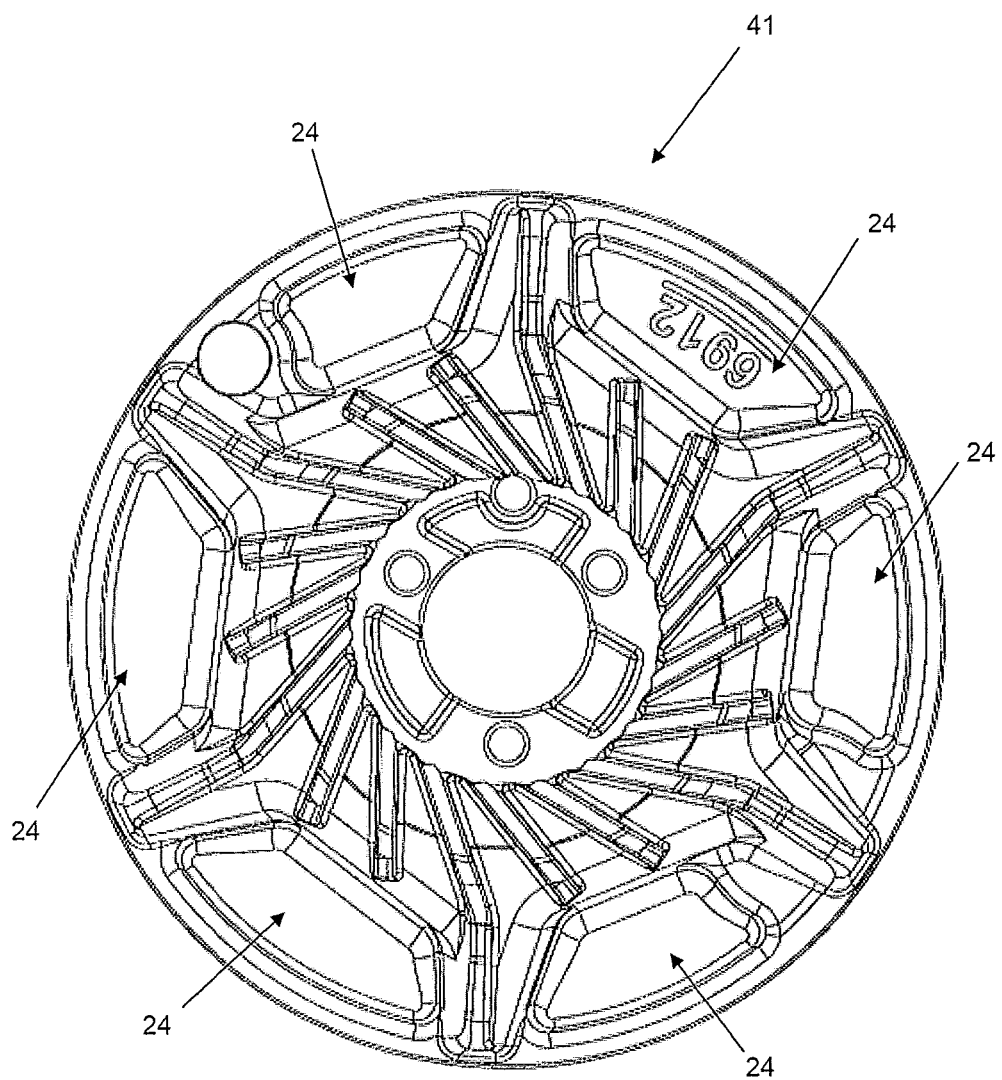
FIG. 11 Is a plan view of a second chain wheel part according to the second embodiment of the invention.
Figure 12:
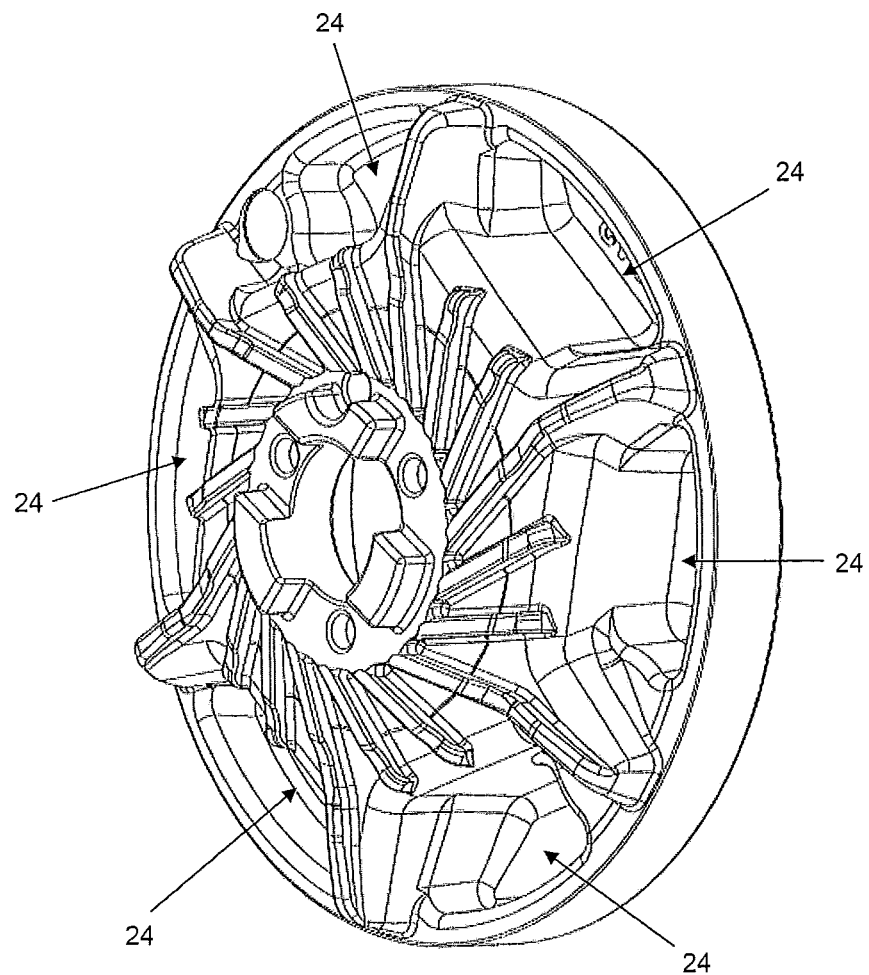
FIG. 12 Is an isometric view of the second chain wheel part of FIG. 11.
Figure 13:
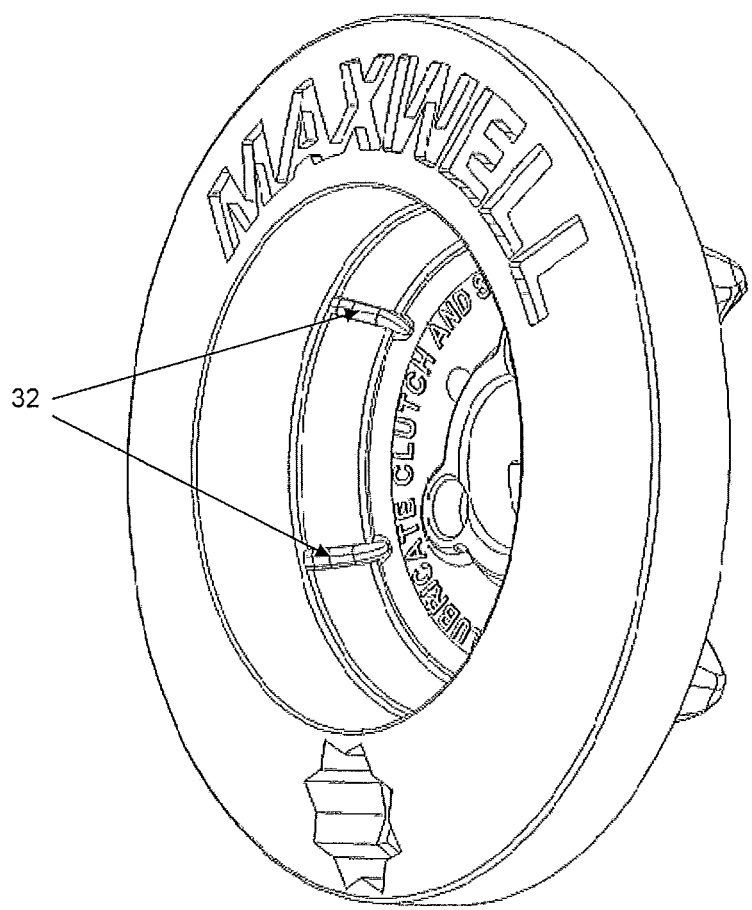
FIG. 13 Is an isometric view of the opposite side of the second chain wheel part of FIGS. 11 and 12.
Figure 14:
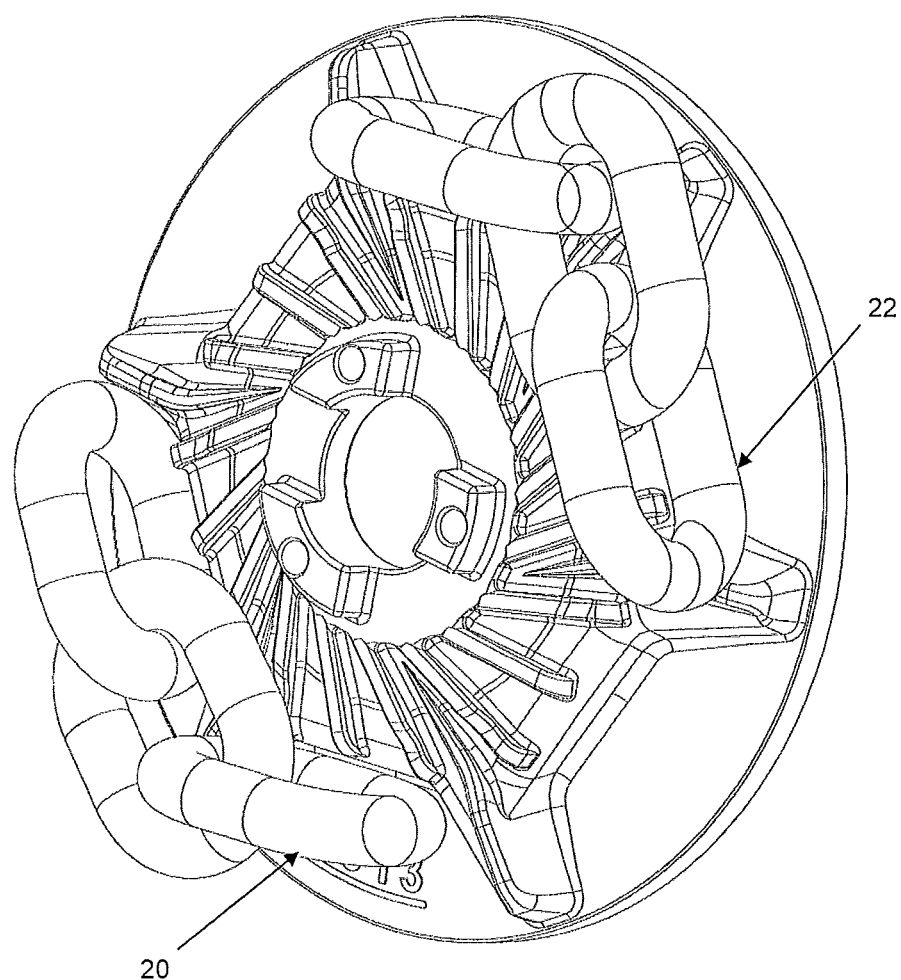
FIG. 14 Is an isometric view showing a partial view of two different types of chain being used with the first chain wheel part of FIGS. 8 to 10.
Figure 15:
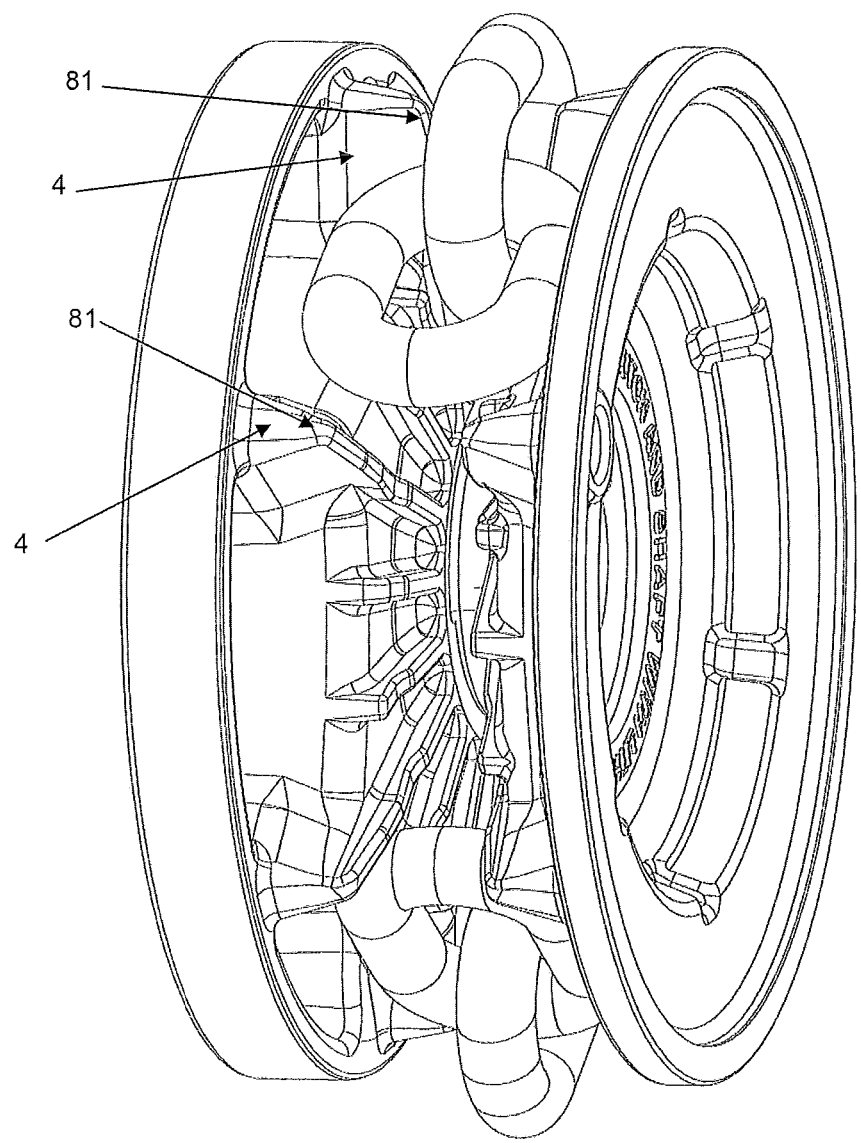
FIG. 15 Is an isometric view of the chain wheel parts of FIGS. 8 to 14 being used together to form a chain wheel.

FIGS. 8 to 15 show first and second chain wheel parts according to a second embodiment of the invention. Many elements of FIGS. 8 to 15 are common with those of FIGS. 1 to 7 and like references have been used for like elements. More particularly, FIGS. 8 to 10 and 14 show a first chain wheel part, FIGS. 11 to 13 show a second chain wheel part and FIG. 15 shows a chain wheel comprising said first and second chain wheel parts of FIGS. 8 to 14. Reference is made to the description in respect of FIGS. 1 to 7 and only distinguishing features of FIGS. 8 to 15 are the subject of specific description.

Referring to FIG. 1, it has been found that when a chain wheel part has been used with chain, wear can occur on the upper surface of protrusions 4 at the first end of each pocket 2. Such wear can lead to the formation of sharp edges which is not desirable, particularly when the chain wheel part is subsequently to be used with rope. To address this problem, in the embodiment shown in FIGS. 8 to 15 (see in particular FIG. 8 in combination with FIG. 10), ridges 81 are provided on protrusions 4, offset from first end 6 of one pocket 2 towards second end 10 of the adjacent pocket 2. This embodiment provides discrete or separate surfaces for engaging with chain links and ropes. Namely, ridges 81 engage rope and the face of protrusion 4 at first end 6 of a pocket 2 engages a chain link.

Also according to the second embodiment, ridges 82 extending from the front face of each pocket 2 towards a central portion of the chain wheel are oriented differently. Both embodiments have ridges 82 offset from being radial to centre of rotation 8 (see in particular FIGS. 4 and 8) but the offset is greater according to the second embodiment. The offset serves to draw rope towards centre of rotation 8 where the spacing of the opposing faces of the first and second chain wheel parts when assembled to form a chain wheel is reduced (see FIGS. 7 and 15), thereby increasing the grip on the rope.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Wherein the foregoing description reference has been made to specific components or integers of the invention having known equivalents then such equivalents are herein incorporated as if individually set forth.

Although the invention has been described by way of example and with reference to possible embodiments thereof, it is to be understood that modifications or improvements may be made thereto without departing from the scope of the invention.

The invention claimed is:

1. A chain wheel part comprising:
   a center defining an axis about which the part is adapted to rotate in use; and a plurality of chain link receiving pockets, each said pocket having a first end configured to receive a first end of a chain link, each link having a length and a width, the length being greater than the width, a second end configured to receive a second end of the chain link, and an inner side extending between the first and second ends of the pocket, wherein the first and second ends are located at opposite ends of the length of the chain link, wherein each pocket is asymmetrically shaped such that the first end of a chain link fully received in the pocket in use and the second end of said chain link fully received in said pocket in use lie in a same plane perpendicular to the axis with the first end of the chain link being nearer to the axis than the second end of the chain link in said plane when in the fully received position in use.

2. The chain wheel part of claim 1, wherein each pocket is provided at an angle other than at 90° to a radial line from the center of the pocket to the center of rotation.

3. The chain wheel part of claim 1, wherein one or more of the pockets includes a recess in a direction parallel to the axis of rotation.

4. The chain wheel part of claim 1, wherein the second end of one pocket is adjacent to the first end of the next pocket.

5. The chain wheel part of claim 1, wherein the wall of the pocket at the first end thereof is offset from being parallel to the axis of rotation.

6. The chain wheel part of claim 1, wherein the wall of the pocket at the second end thereof is offset from being parallel to the axis of rotation.

7. The chain wheel part of claim 1, comprising a rib extending from between an adjacent pair of pockets to a central region of the chain wheel part.

8. The chain wheel part of claim 1, wherein a portion of the rib between the adjacent pair of pockets is offset from the first end of the first pocket of the pair towards the second end of the second pocket of the pair.

9. The chain wheel part of claim 1, comprising one or more ribs extending from the inner side of each pocket to a central region of the chain wheel part.

10. The chain wheel part of claim 1, wherein the wall of the pocket at the first end thereof is offset from being radial to the axis of rotation.

11. The chain wheel part of claim 1, wherein the wall of the pocket at the second end thereof is offset from being radial to the axis of rotation.

12. A chain wheel part comprising:
a center defining an axis about which the part is adapted to rotate in use; and
a plurality of chain link receiving pockets defined in part by a plurality of discrete protrusions extending radially outward from the center, each said pocket having a first end configured to receive a first end of a chain link, a second end configured to receive a second end of the chain link, and an inner side extending between the first and second ends of the pocket, wherein each protrusion defines one first end of one pocket and one second end of an adjacent pocket;
wherein each pocket is shaped such that a first end of a chain link fully received in the pocket in use and a second end of said chain link fully received in said pocket in use lie in a same plane perpendicular to the axis, wherein ends of the links that are fully received in the pockets directly face the respective protrusions, and
wherein, the first end of the chain link is nearer to the axis than the second end of the chain link in said plane when in the fully received position in use.

13. A chain wheel part comprising:
a center defining an axis about which the part is adapted to rotate in use; and
a plurality of chain link receiving pockets for receiving a plurality of chain links, each said pocket having a first end configured to receive a first end of a chain link, a second end configured to receive a second end of the chain link, and an inner side extending between the first and second ends of the pocket, wherein the first and second ends are located at opposite ends of the length of the chain link;
wherein each pocket is asymmetrically shaped such that the first end of a chain link fully received in the pocket in use and the second end of said chain link fully received in said pocket in use lie in a same plane perpendicular to the axis, and
wherein, the first end of the chain link is nearer to the axis than the second end of the chain link in said plane when in the fully received position in use.

\* \* \* \* \*